(12) United States Patent
Wegkamp (10) Patent No.: US 8,074,786 B2
(45) Date of Patent: Dec. 13, 2011

(54) MOUNTING ARRANGEMENT

(76) Inventor: Rene Wegkamp, Sandton (ZA)

( * ) Notice: Subject to any disclaimer, the term of this patent is extended or adjusted under 35 U.S.C. 154(b) by 448 days.

(21) Appl. No.: 12/093,226

(22) PCT Filed: Nov. 8, 2006

(86) PCT No.: PCT/IB2006/054158
§ 371 (c)(1),
(2), (4) Date: Jul. 21, 2008

(87) PCT Pub. No.: WO2007/054898
PCT Pub. Date: May 18, 2007

(65) Prior Publication Data
US 2008/0271977 A1    Nov. 6, 2008

(30) Foreign Application Priority Data
Nov. 10, 2005   (ZA) .................... 2005/09096

(51) Int. Cl.
*B65G 25/04*        (2006.01)
(52) U.S. Cl. .................. 198/750.2; 198/750.1
(58) Field of Classification Search ..... 198/750.1–750.7
See application file for complete search history.

(56) References Cited

U.S. PATENT DOCUMENTS

| | | | | |
|---|---|---|---|---|
| 214,408 A | * | 4/1879 | Layton | 411/132 |
| 1,004,941 A | * | 10/1911 | Tice | 238/191 |
| 1,261,609 A | * | 4/1918 | Pierce | 411/98 |
| 1,959,855 A | * | 5/1934 | Chamness et al. | 238/64 |
| 2,354,485 A | * | 7/1944 | Slaughter | 52/578 |
| 3,460,304 A | * | 8/1969 | Glaza et al. | 52/588.1 |
| 5,165,524 A | * | 11/1992 | Foster | 198/750.4 |
| 5,187,843 A | * | 2/1993 | Lynch | 24/587.12 |
| 5,638,943 A | * | 6/1997 | Foster | 198/750.5 |
| 6,138,329 A | * | 10/2000 | Johnson | 24/584.1 |
| 7,260,871 B2 | * | 8/2007 | Borchardt et al. | 24/399 |
| 2005/0241919 A1 | | 11/2005 | Peterson | |

OTHER PUBLICATIONS

International Search Report for International Application No. PCT/IB2006/054158, European Patent Office, mailed Mar. 27, 2007, 3 pgs.
Written Opinion of the International Searching Authority for International Application No. PCT/IB2006/054158, European Patent Office, 5 pgs.

* cited by examiner

*Primary Examiner* — Gene Crawford
*Assistant Examiner* — William R Harp
(74) *Attorney, Agent, or Firm* — Sterne, Kessler, Goldstein & Fox PLLC (57) ABSTRACT

A method of mounting a floor slat (14) of a reciprocating floor to an associated drive beam (18.1) of the floor slat includes mounting an elongate clamp member (200) to the drive beam (18.1). The clamp member (200) has opposed side walls defining a longitudinally extending clamping slot between them. The floor slat (14) is located on the clamp member (200). The floor slat (14) has a downwardly depending longitudinally extending mounting member (208) which is received in the clamping slot. The mounting member (208) is clamped in the clamping slot thereby to attach the floor slat (14) to the clamp member (200) and thus to the drive beam (18.1).

13 Claims, 9 Drawing Sheets

MOUNTING ARRANGEMENT

CROSS REFERENCE TO RELATED APPLICATIONS

This application is a national stage filing of and claims the benefit of the filing date of International Application No. PCT/IB2006/054158 filed Nov. 8, 2006, which claims the benefit of the filing date of ZA 2005/09096 filed Nov. 10, 2005.

BACKGROUND OF THE INVENTION

THIS INVENTION relates to a mounting arrangement. In particular, the invention relates to a method of mounting floor slats of a reciprocating floor to drive beams thereof, and to a reciprocating floor which includes a mounting arrangement mounting floor slats thereof to a drive beam thereof.

Reciprocating floors are known and typically include two or three drive beams, with typically aluminium floor slats or planks or sections mounted to their associated drive beam to move in a reciprocating fashion with the drive beam. The Applicant is aware of reciprocating floors, also known as reciprocating floor conveyors, in which the floor slats are fastened to mounting elements welded to their associated drive beams. This process however has the disadvantage that the welding may cause bending of the drive beams, which then have to be straightened again, causing additional manufacturing expense. The Applicant is also aware of reciprocating floors in which the floor slats are bolted by means of four or more countersunk bolts per floor slat to their associated drive beams. The drilling and countersinking of the bolt holes in the floor slats take about 10 man hours for a typical vehicle mounted reciprocating floor and is thus a costly labour intensive part of the floor installation process.

The Applicant is furthermore aware of reciprocating floors in which the floor slats are clamped downwards onto their associated drive beams, employing bolts which are accessed from below and which pull downwards on a clamping member fitting inside the floor slat and pressing down on opposed longitudinally extending inwardly projecting bottom lips of the floor slats. This clamping arrangement provides no additional support to the floor slats in the area where the drive unit (typically a hydraulic drive unit) of the reciprocating floor is mounted below the floor slats, requiring that the aluminium floor slats be designed with a fairly high side wall of about 34 mm to strengthen them in the area where the drive unit is mounted. The floor slats are however typically aluminium extrusions, meaning that the high side wall with its associated cost and weight extends the entire length of the floor slat, whereas it is only required in the area where the drive unit is mounted. Some of the bolts of the clamping arrangement are also difficult to access from below making assembly difficult. With this clamping arrangement, the drive unit also does not receive much support from the floor slats, which are flexible and only clamped down over a length of about 200 mm, allowing the hydraulic cylinder of the drive unit to which the drive beam is mounted to bend or tilt under load, causing unnecessary stress in the cylinder mounting.

BRIEF SUMMARY OF THE INVENTION

According to one aspect of the invention, there is provided a method of mounting a floor slat of a reciprocating floor to an associated drive beam of the floor slat, the method including mounting an elongate clamp member to the drive beam, the clamp member having opposed side walls defining a longitudinally extending clamping slot between them;

locating the floor slat on the clamp member, the floor slat having a downwardly depending longitudinally extending mounting member which is received in the clamping slot; and clamping the mounting member in the clamping slot thereby to attach the floor slat to the clamp member and thus to the drive beam.

Mounting the elongate clamp member to the drive beam may include bolting the elongate clamp member to the drive beam. Advantageously, no welding is thus required to mount the clamp member to its associated drive beam and as the clamp member can be manufactured with pre-drilled holes, no drilling is required during assembly to mount the clamp member to its associated drive beam. Preferably, the bolts are inserted from the top through the clamping member and engage threaded bores provided inside the drive beam, which is preferably a hollow beam.

Mounting the elongate clamp member to the drive beam may include locating a spacer between the clamp member and the drive beam. Preferably, the spacer is elongate with a length which is greater than a width of the drive beam so that when the spacer is arranged transverse to the drive beam, end portions of the spacer project outwardly transversely from the drive beam. Preferably, ends of the spacer are rounded or provided with a radius. The spacer may be an aluminium spacer.

The elongate clamp member typically has a length substantially greater than the width of its associated drive beam, e.g. more than twice the width when the reciprocating floor has two drive beams, or more than three times the width when the reciprocating floor has three drive beams. The clamp member mounted to a drive beam may thus project over any or all other drive beams when the drive beams are arranged together at one end of their usual cyclic linear path. A clamp member mounted to an outer drive beam, i.e. a drive beam flanked by only one other drive beam and not located between two other drive beams, may also project transversely over an edge of the drive beam to which it is being mounted, said edge not being flanked by an edge of another drive beam. The spacer and the clamp member may form a doubling plate arrangement, with the clamp member projecting outwardly further from the drive beam than the spacer, advantageously providing for stress dispersion and inhibiting the formation of cracks.

The mounting member may increase in transverse dimension in a downward direction over at least a portion thereof. In other words, the mounting member may have at least one region in which it thickens downwardly, forming a key portion. The clamping slot may be dimensioned and shaped complementary to the key portion, being narrower in an upper region than lower down where the key portion is received, thereby to lock the key portion inside the clamping slot and preventing or inhibiting upwards movement of the mounting member from the clamping slot. Preferably, the clamping slot and the mounting member cooperate to prevent any upwards or downwards movement of the floor slat relative to the clamp member.

Locating the floor slat on the clamp member may include sliding the floor slat in a longitudinal direction over the clamp member, with the mounting member sliding in a longitudinal direction into the clamping slot. Instead, the clamp member may define a clamping slot into which the mounting member can be inserted from above. Such a clamping slot may thus have a wider opening or mouth to receive the mounting member from above.

Clamping the mounting member in the clamping slot may include forcing at least parts of the opposed side walls of the clamp member closer together thereby to narrow the clamping slot in at least one region. Preferably, predominantly upper portions of the opposed side walls are forced closer together, thereby predominantly narrowing an upper region of the clamping slot, locking the key portion inside the clamping slot. The opposed side walls may be forced together in a plurality of longitudinally spaced regions, e.g. four longitudinally spaced regions. Preferably, the regions are evenly spaced along the length of the mounting member.

Forcing the opposed side walls of the clamp member closer together typically includes tightening a fastener, e.g. a nut and bolt arrangement, acting transversely inwardly on the opposed side walls, preferably against upper portions of the opposed side walls.

Preferably, the mounting member is clamped in the clamping slot by forces acting on the opposed side walls in regions of the opposed side walls not located above the drive beam, or at least not where the clamp member is bolted to the drive beam. Advantageously, if clamping takes place immediately adjacent a drive beam, the fastener can be accessed from above but also from below, with a fastening tool such as an Allen key being receivable between two adjacent drive beams.

Clamping the mounting member in the clamping slot may include inserting a dowel into the clamping slot. The dowel may be inserted through the floor slat from above, to wedge between the mounting member and one of the side walls of the clamp member.

Instead, or in addition, the method of the invention may include inserting a grub screw or grub screws through one or both of the side walls of the clamp member to act against the mounting member.

As will be appreciated, any potential slipping of the floor slat relative to the clamp member can be eliminated by the use of dowels and/or grub screws.

The method may include locating a bearing sheet, e.g. a planar bearing sheet, between the clamp member and a drive beam over which the clamp member projects but to which it is not mounted. The bearing sheet may be of a synthetic plastics or polymeric material, and advantageously provides more support below the clamp member to resist impact or applied forces from above and also provides additional stiffening to the drive beam. The bearing sheets also assist in counteracting tilting forces experienced by slide bushes or collars on which the drive beams, in at least one embodiment of the invention, are supported. Ends of the bearing sheet may be rounded or radiused thereby to inhibit crack formation in the drive beam.

According to another aspect of the invention, there is provided a reciprocating floor which includes at least one drive beam operable to move in a reciprocating fashion with a plurality of floor slats mounted to the drive beam by means of associated elongate clamp members, at least some of the clamp members having opposed side walls defining a longitudinally extending clamping slot between them and at least some of the floor slats having downwardly depending longitudinally extending mounting members that are clamped inside the clamping slots of their associated clamp members.

Typically, the drive beam is hollow, with the clamp members being bolted to the drive beam and being longitudinally spaced and transversely arranged to the drive beam.

The reciprocating floor may include spacers between the clamp members and the drive beam. The spacers may be elongate and planar. The spacers may be as hereinbefore described.

Typically, the reciprocating floor includes at least two, e.g. two or three, drive beams each having a plurality of associated floor slats mounted thereto.

The elongate clamp members may be as hereinbefore described, and may include threaded fasteners acting on the side walls to clamp the mounting members of their associated floor slats between the side walls. Advantageously, the clamp members typically have continuous bases extending along their entire lengths, with no apertures or slots in a vertical direction, apart from the bolt holes through which the bolts are fitted that bolt the clamp members to the drive beams. This substantially strengthens the clamp members.

Ends of the clamp members may have recesses extending inwardly in a longitudinal direction of the clamp members. The recesses may be provided in any one or more of the base and side walls, and/or in upper surfaces of the clamp members, e.g. as defined by the side walls. These recesses advantageously reduce stress to inhibit crack formation in the typically aluminium components.

The mounting members may be as hereinbefore described. Typically, a mounting member extends substantially the entire length of the floor slat, and is preferably continuous from end to end.

The clamping slots may be as hereinbefore described.

The opposed side walls of a clamp member may have outer wall surfaces which are further apart in upper regions thereof, than in lower regions thereof. In one embodiment of the invention, the outer wall surfaces roughly define a "V". The outer wall surfaces may thus define bearing surfaces against which the threaded fasteners act inwardly to clamp a mounting member between the side walls.

The side walls may taper downwardly in transverse cross-section to define a bending region of horizontally narrower transverse cross-section in a lower region thereof, thereby to assist the forcing closer together of the side walls in upper regions thereof by the threaded fasteners.

The threaded fasteners may be in the form of nut and bolt arrangements, with the bolts thus extending transversely through the opposed side walls of a clamp member, typically below the mounting member. The nut and bolt arrangements may include force transferring washer elements acting against the side walls or bearing surfaces. The washer elements may be elongate and may be L-shaped in transverse cross-section, advantageously also acting to lock the nut or the bolt of a nut and bolt arrangement.

At least some of the threaded fasteners may be located in regions of the opposed side walls not located above the drive beam, or at least not where the clamp member is bolted to the drive beam. Thus, preferably at least some of the threaded fasteners are located immediately adjacent the drive beam so that they can be accessed from above but also from below, with a fastening tool such as an Allen key, being receivable between two adjacent drive beams.

The reciprocating floor may include dowels wedged between the mounting member and a side wall of a clamp member. The dowel may pass through the floor slats from above.

The reciprocating floor may include grub screws passing through one or both side walls of a clamp member, acting against the mounting member or passing into the mounting member.

The reciprocating floor may include a bearing sheet sandwiched between a clamp member and a dive beam over which a clamp member projects but to which it is not mounted or fastened. The bearing sheet may be as hereinbefore described.

BRIEF DESCRIPTION OF THE DRAWINGS

The invention will now be described, by way of example only, with reference to the accompanying diagrammatic drawings in which.

DETAILED DESCRIPTION OF THE INVENTION

Figure 1:
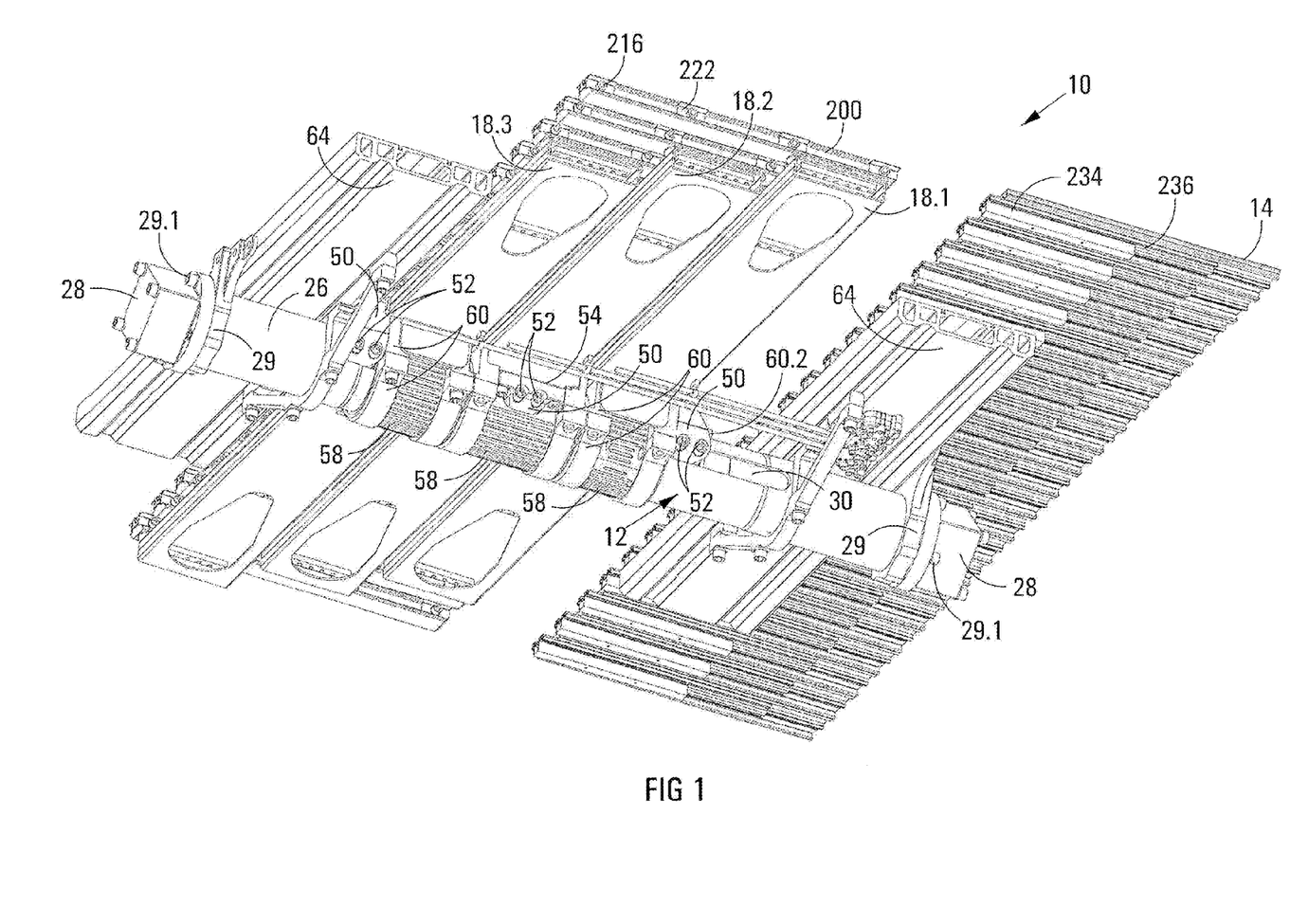
FIG. 1 shows a three-dimensional bottom view of a portion of a reciprocating floor in accordance with the invention, with portions sectioned or cut away or omitted for clarity.
Figure 2:
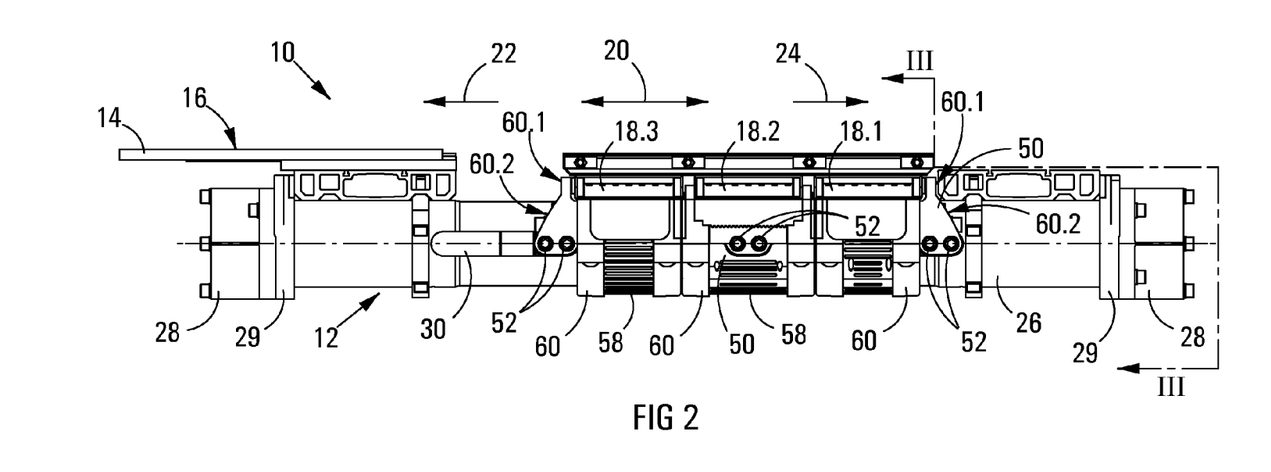
FIG. 2 shows a side elevational view of a portion of the reciprocating floor of FIG. 1, with portions sectioned or cut away for clarity.
Figure 3:
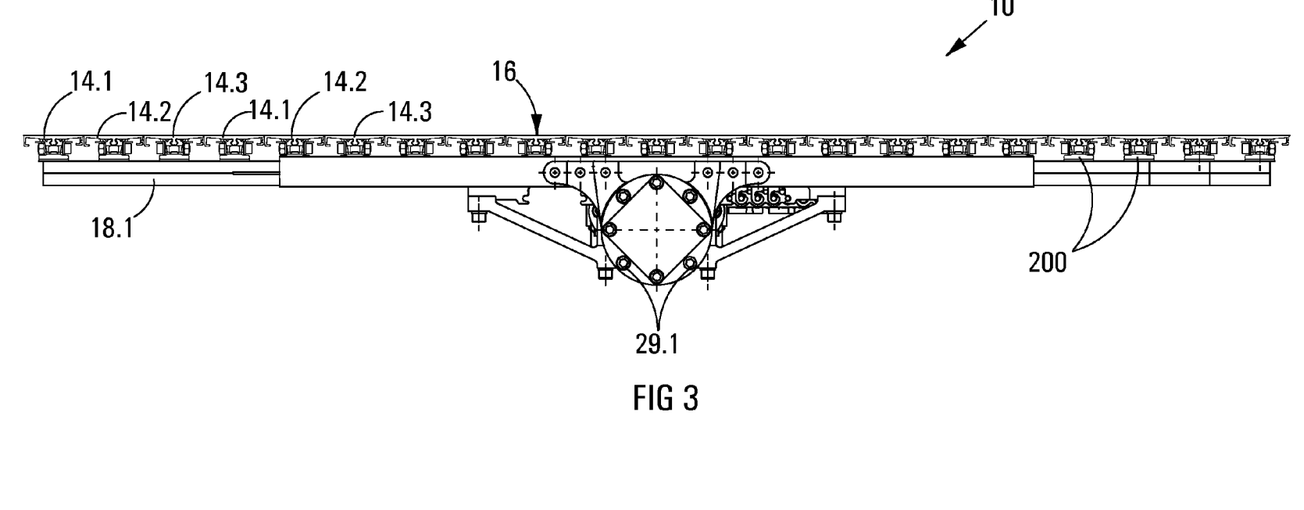
FIG. 3 shows a transverse vertical sectioned view of the reciprocating floor of FIG. 1, taken at III-III in FIG. 2.

Referring to FIGS. 1 to 3, reference numeral 10 generally indicates a reciprocating floor or reciprocating floor conveyor in accordance with the invention. The reciprocating floor 10 shown is of the kind which is typically installed in a vehicle such as a heavy cargo vehicle.

The reciprocating floor 10 comprises a plurality of elongate floor members or slats 14 arranged side by side to define a floor surface 16 (see FIG. 3). The slats 14 are arranged or grouped together in three groups 14.1, 14.2 and 14.3. Thus, when starting from the left in FIG. 3, the first slat, and every third slat thereafter, belongs to the group 14.1. The second slat, and every third slat thereafter, belongs to the group 14.2 and the third slat, and every third slat thereafter, belongs to the group 14.3.

The slats of the group 14.1 are attached or mounted to a transverse drive beam 18.1, the slats of the group 14.2 are attached or mounted to a transverse drive beam 18.2 and the slats of the group 14.3 are attached or mounted to a transverse drive beam 18.3.

The reciprocating floor 10 includes a linear hydraulic motor 12 by means of which the transverse drive beams 18.1, 18.2 and 18.3, and thus the groups of slats 14.1, 14.2 and 14.3, are reciprocatingly moved backwards and forwards in a particular sequence, in the direction of the double-headed arrow 20 shown in FIG. 2. The operation of a reciprocating floor or reciprocating floor conveyor is well known to those skilled in the art, and only a very brief description of the sequence of the displacement of the groups of slats 14.1, 14.2 and 14.3 will be given.

In order to displace a load, such as a load of wood chips supported on the floor surface 16, the group of slats 14.3 is displaced longitudinally by means of the transverse drive beam 18.3 in, say, the direction of arrow 22 shown in FIG. 2 of the drawings. Thereafter, the group of slats 14.2 is displaced by means of the transverse drive beam 18.2 in the direction of arrow 22, followed by the displacement of the group of slats 14.1 by means of the transverse drive beam 18.1 in the direction of the arrow 22. As will be appreciated, with one third of the slats 14 only being displaced each time, the load supported on the floor surface 16 remains stationary. Once all three groups 14.1, 14.2 and 14.3 have been displaced in the direction of the arrow 22, all three groups 14.1, 14.2 and 14.3 are simultaneously displaced in the direction of the arrow 24 shown in FIG. 2, thus moving the entire load supported on the floor surface 16 in the direction of the arrow 24. This process is then repeated cyclically in order to move the load stepwise in the direction of the arrow 24 over the floor surface 16.

The linear hydraulic motor 12 is of the general kind described in WO 2004/067967 or, more particularly, in PCT/IB2005/003187. The motor 12 includes an elongate circular cylinder 26. Ends of the cylinder 26 are closed by means of end caps 28. The end caps 28 are bolted to the cylinder 26. Each end cap 28 comprises an end head with an integral spigot portion 28.1 (see FIG. 5) which slides into the cylinder 26 with the end head abutting against a flange 29 provided at the open ends of the cylinder 26. Threaded bolts 29.1 screw into threaded bolt holes in the flange 29 to mount the end caps 28 to the cylinder 26. An O-ring seal 29.2 is provided on the spigot portion to ensure adequate sealing between the spigot portion and the cylinder 26.

The end caps 28 include internal valve arrangements which are not shown. Advantageously, with the arrangement of the end caps 28 as shown, hydraulic fluid ports can simply extend through the end caps 28. In the embodiment of the invention shown in the drawings, it is required that two of the hydraulic fluid ports must have a tube 29.3 which extends into the cylinder 26 and then respectively through a head portion of a piston 34.3 and through a head portion of a piston 34.1, which will be described in more detail hereinafter. Each tube 29.3 is simply bolted to the spigot portion 28.1 of the end cap 28.

Six longitudinally extending apertures or slots 30 are provided in the cylinder 26. The slots 30 are arranged in three longitudinally spaced groups of two each, with the two slots 30 of each group being located on diagonally opposed sides of the cylinder 26, facing sideways in a horizontal direction. In the embodiment of the linear hydraulic motor 12 shown in the drawings, the cylinder 26 has an internal diameter of about 140 mm, a length of about 1570 mm (including the flanges 29) and slots 30 with a length of about 300 mm each. Centres of the slots 30 are spaced about 356 mm.

Three pistons 34.1, 34.2 and 34.3 are axially, reciprocatingly slidingly, located inside the cylinder 26. End portions of each piston 34.1, 34.2, 34.3 are hollow, thus advantageously reducing the weight of the pistons. Furthermore, the opposed hollow end portions of the piston 34.2 each define a bore 36 within which elongate end portions of the piston 34.1 and 34.3 are received in a sealing and sliding manner. The end portions of the pistons 34.1 and 34.3 are thus guided in the bores 36. As will thus be noted, between the cylinder 26 and the piston 34.1, 34.2 and 34.3, four varying capacity chambers 38.1, 38.2, 38.3 and 38.4 for receiving and expelling hydraulic fluid are defined. These chambers can clearly be seen in FIG. 5 of the drawings.

Annular critical hydraulic fluid seals 40 seal the piston 34.1 and 34.3 against an interior surface of the cylinder 26. Similarly, annular hydraulic fluid seals 42 seal the pistons 34.1 and 34.3 against interior surfaces of the bores 36 defined by the piston 34.2. If desired, annular bands of friction-reducing material, such as VESCONITE (trade name), nylon or brass which can act as bearing surfaces for the piston 34.2, may be provided in order to facilitate axial displacement of the piston 34.2 inside the cylinder 26. Such annular bands are however not shown in the drawings.

Each piston 34.1, 34.2 and 34.3 is associated with two force transfer members or wings 50. The force transfer members 50 thus extend through associated slots 30 in use to transfer force from the pistons 34.1, 34.2 and 34.3 to which the force transfer members 50 are secured, sideways through the cylinder 26 to an associated one of the transverse drive beams 18.1, 18.2, 18.3. The force transfer members 50 are each bolted by means of two bolts 52 to its associated piston 34.1, 34.2 or 34.3. A curved contact area 51 between each force transfer member 50 and its associated piston 34.1, 34.2, 34.3 is corrugated, providing an interlocking feature to inhibit relative longitudinal displacement of the piston 34 and the force transfer member 50. This arrangement can be clearly seen in FIG. 5 of the drawings.

As can be seen in FIG. 1 of the drawings, the force transfer members 50 connecting the pistons 34.1 and 34.3 to the drive beams 18.1 and 18.3 extend upwardly to engage the drive beams 18.1 and 18.3 respectively against side walls thereof. In contrast, the force transfer members 50 connecting the piston 34.2 to the drive beam 18.2 are mounted to a bottom wall or floor of the transverse drive beam 18.2, also employing a corrugated contact arrangement as shown at 54 in FIG. 1.

Each pair of slots 30 is associated with a split collar 58 comprising an upper half 58.1 and a lower half 58.2. The upper and lower halves 58.1, 58.2 of the collars 58 encircle the cylinder 26. The four half collars 58 associated with the end apertures or slots 30 abut the four outer force transfer members 50 to travel with the outer force transfer members 50 along the length of the cylinder 26 in the directions of the double-headed arrow 20 as shown in FIG. 2 of the drawings with the force transfer members 50 limiting the longitudinal travel of the collars 58 to the length of the slot 30 minus the width of the force transfer members 50, i.e. about 190 mm. The centre collar 58 defines two apertures corresponding to the centre slots 30 through which the two centre force transfer members 50 project. Typically, one slot is provided in the upper collar half 58.1 and one slot is provided in the lower collar half 58.2. Preferably, the upper and lower collar halves 58.1, 58.2 do not meet in a horizontal plane, but rather in a plane which is arranged at an angle to the horizontal. Pairs of semi-circular brackets or split rings 60 bolt the split collars 58 to their associated drive beams 18.1, 18.2 and 18.3. Each of the transverse drive beams 18.1, 18.2, 18.3 is thus supported by an associated one of the upper collar halves 58.1. When a piston, such as the piston 30.2 is displaced axially inside the cylinder 26, its associated transverse drive beam 18.2 moves in unison with the piston 30.2, sliding on the upper collar half 58.1 over the cylinder 26. The force transfer members 50 associated with the drive beams 18.1 and 18.3 are bolted against the side walls of the drive beams 18.1 and 18.3 respectively at 60.1 (see FIG. 2), but also against outermost split rings 60 at 60.2 in FIG. 2, using bolts that are thus parallel to the longitudinal axis of the cylinder 26.

Figure 5:
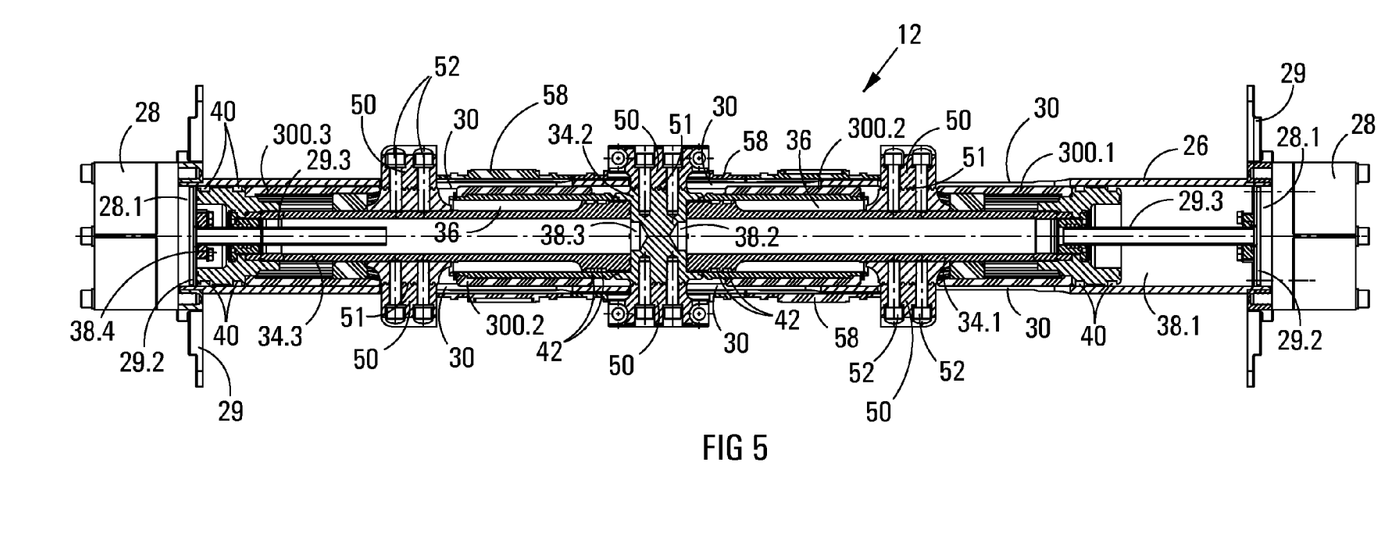
FIG. 5 shows a horizontal longitudinal section through a linear hydraulic motor of the reciprocating floor of FIG. 1.

As can be clearly seen in FIG. 5 of the drawings, each piston 34.1, 34.2, 34.3 has at least one longitudinally extending portion which is of a substantially reduced diameter compared to the inside diameter of the cylinder 26. Over these portions, internal reinforcing members 300.1, 300.2 and 300.3 are located. The piston 34.2 supports two internal reinforcing members 300.2, each in the form of a circular cylindrical sleeve which is fastened to the piston 34.2 by grub screws (not shown). The reinforcing members 300.1 and 300.3 extend longitudinally from immediately behind the head portion of the pistons 34.1 and 34.3 respectively to where the force transfer members 50 are bolted to the pistons 34.1 and 34.3 and are thus caught between the head portions of the pistons and the force transfer members 50. The reinforcing members 300.2 extend longitudinally from ends of the piston 34.2 some distance towards where the force transfer members 50 are bolted to the piston 34.2. Typically, the reinforcing members 300.1, 300.2 and 300.3 are of a synthetic plastics or polymeric material such as VESCONITE (trade name), which is a low kinetic or dynamic friction material.

The reinforcing members 300.1, 300.2 and 300.3 are concentric with the cylinder 26, and in particular with the internal surface thereof, and bridge the apertures or slots 30 when sliding past the slots 30. The reinforcing members 300.1, 300.2, 300.3 fit with a slight clearance of about 0.25 mm inside the cylinder 26.

Figure 6:
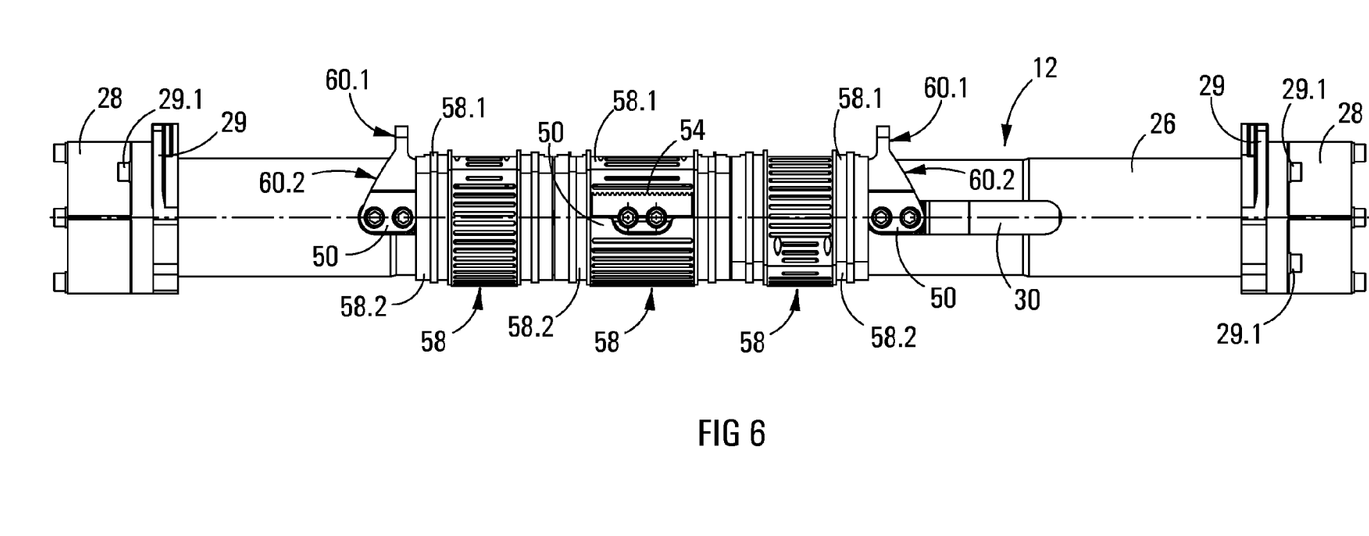
FIG. 6 shows a side elevational view of the linear hydraulic motor of FIG. 5.

The reciprocating floor conveyor 10, as illustrated, forms part of a heavy load-bearing vehicle, with the floor surface 16 defining the load-bearing surface of the vehicle. In FIG. 1 of the drawings, two transverse chassis beams 64 of the vehicle, from which the linear hydraulic motor 12 is suspended, are shown. Also in FIG. 1, the three drive beams 18.1, 18.2 and 18.3 are shown in positions where they are as far to the left as possible, i.e. with all three of the pistons 34.1, 34.2 and 34.3 as far to the left inside the cylinder 26 as is possible, as is shown in FIGS. 5 and 6 of the drawings. In order to displace the transverse drive beam 18.1 to the right, and thus also to displace the slats of the group of slats 14.1 to the right, a hydraulic fluid, typically a hydraulic oil, is injected into the chamber 38.2 through the tube 29.3, thus forcing the piston 34.1 to the right as far as it can go. At this time, the pistons 34.2 and 34.3 can not be displaced to the left. In order to displace the piston 34.2 to the right, hydraulic fluid is then forced into the chamber 38.3 through the other tube 29.3. At this time, the piston 34.3 can not be displaced to the left. The piston 34.3 is then displaced to the right against the piston 34.2 by injecting hydraulic fluid into the chamber 38.4 (through a port in the end cap 28 which is not shown). In order to return all three of the pistons 34.1, 34.2 and 34.3 to the starting position in which they are as far to the left as possible, hydraulic fluid is forced into the chamber 38.1 (through a port in the other end cap 28 which is also not shown), thus pushing all three pistons 34.1, 34.2, 34.3 simultaneously to the left. In this fashion, the movement sequence of the group of slats 14.1, 14.2, 14.3 is established. It is however to be appreciated that the sequence can also be reversed, with all the pistons starting at the right in FIG. 5.

Figure 4:
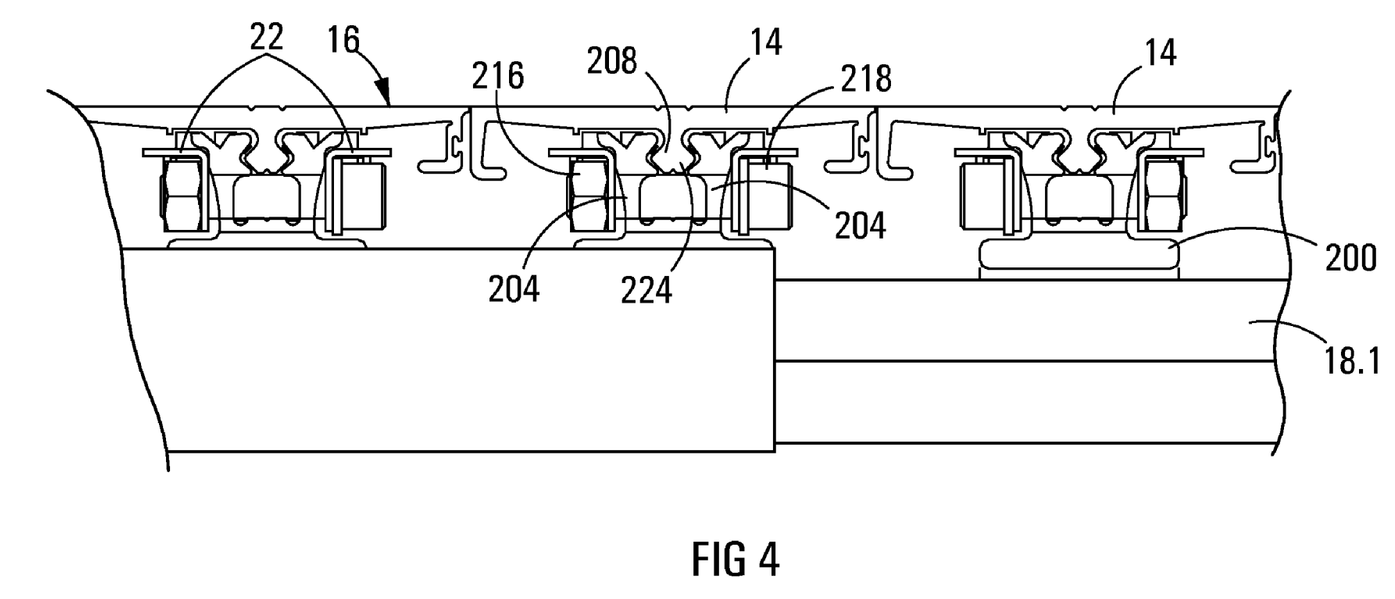
FIG. 4 shows an enlarged portion of FIG. 3.

Force is transferred from the linear hydraulic motor 12 to the floor slats 14 via the transverse drive beams 18. It is thus very important that the slats 14 are securely mounted to the drive beams 18. In accordance with the invention, the slats 14 are mounted to the drive beams 18 by means of associated elongate clamp members or fingers 200. Each clamp member 200 is bolted to its associated drive beam 18 by means of seven bolts 202 passing through pre-drilled bolt holes 202.1 and comprises a pair of opposed side walls 204. A longitudinally extending clamping slot 206 is defined between the side walls 204 of the clamp member 200. As can be clearly seen in FIG. 4 of the drawings, each floor slat 14 has a downwardly depending mounting member 208 which is received inside the clamping slot 206 and which is clamped inside the clamping slot 206. The mounting members 208 extend the entire length of the floor slats 14.

The drive beams 18 are hollow. The clamp members 200 are longitudinally spaced and transversely arranged relative to the drive beams 18. In the embodiment of the invention shown in the drawings, there are twenty-one floor slats 14 and thus twenty-one clamp members 200, with seven clamp members 200 mounted to each of the drive beams 18.1, 18.2 and 18.3 respectively.

Figure 9:
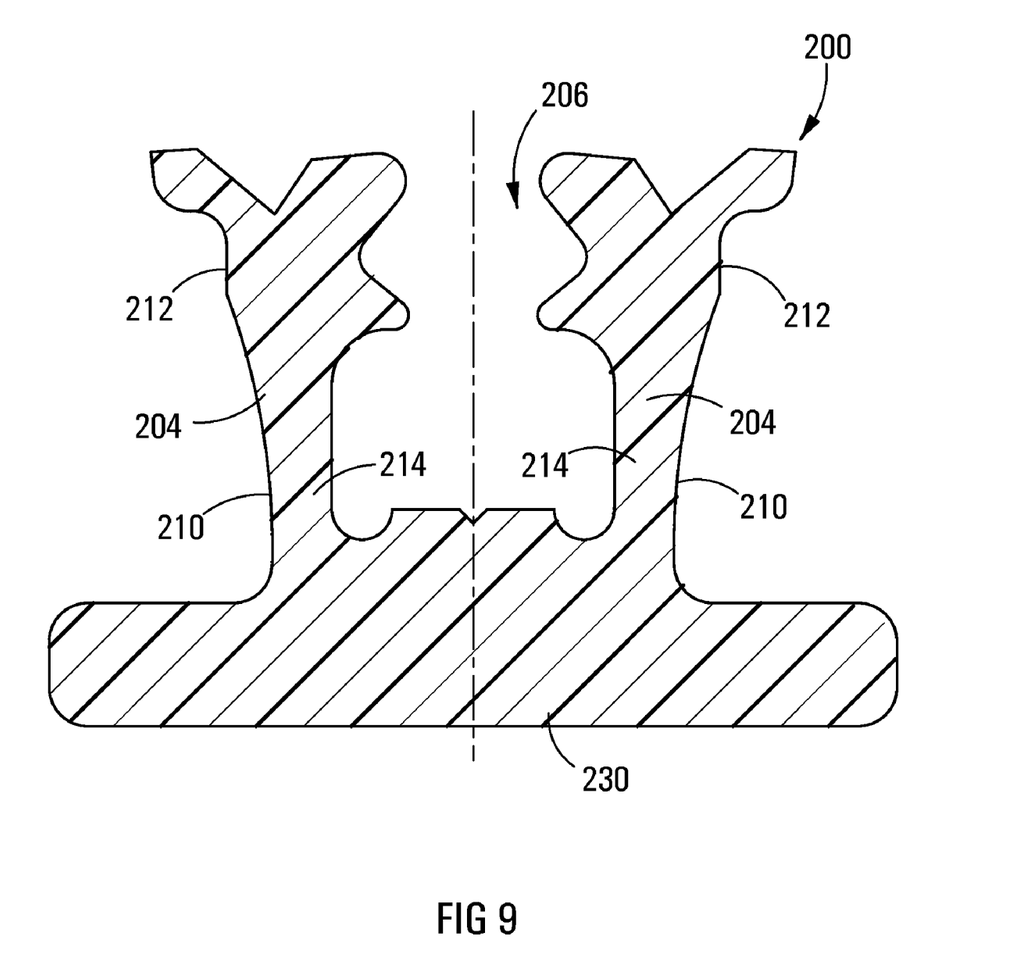
FIG. 9 shows a transverse cross-sectional view of the clamp member of FIG. 7, taken at IX-IX in FIG. 7.

The opposed side walls 204 of the clamp members 200 are further apart in upper regions thereof, than in lower regions thereof, as can be clearly seen in FIG. 9 of the drawings. Outer wall surfaces 210 of the side walls 204 thus roughly define a "V". The outer wall surfaces 210 also define bearing surfaces 212.

The side walls 204 taper downwardly in transverse cross-section to define a bending region 214 which is of a horizontally narrower transverse cross-section than higher regions of the side walls 204.

The mounting members 208 are clamped inside the clamping slots 206 by means of nuts 216 and bolts 218. Four apertures 220 are provided in each side wall 204 to receive a bolt 218. As can be clearly seen in FIG. 4 of the drawings, the bolts 218 pass below the mounting member 208. Elongate washer elements 222, which are L-shaped in transverse cross-section, are located between each bolt head and a side wall 204, and between each nut 216 and a side wall 204. The washer elements 222 bear against the bearing surfaces 212. In other words, the washer elements 222 bear against upper regions of the side walls 204 so that when the nuts 216 and bolts 218 are tightened, the side walls 204 move closer together in upper regions thereof, bending about the bending regions 214. The washer elements 222 located between the nuts 216 and the side walls 204 also interfere with the rotation of the nuts 216, thus acting to lock the nuts 216.

Each mounting member 208 has a thickened portion or key portion 224. The clamping slot 206 is shaped complementary to the key portion, being narrower in an upper region above the key portion, thereby to lock the key portion inside the clamping slot 206 and preventing upwards movement of the mounting member 208 from the clamping slot 206.

A spacer 226 is located between each damp member 200 and its associated drive beam 18 to which it is bolted. The spacer 226 is typically of aluminium and has a thickness of about 3 mm. The spacer 226 has radiused ends and typically has a length of about 220 mm, which is longer than the width of a drive beam 18, which is typically about 200 mm. Thus, as can clearly be seen in FIGS. 10 and 11 of the drawings, the radiused end portions of the spacers 226 project transversely outwardly over edges of the drive beams 18.

Figure 10:
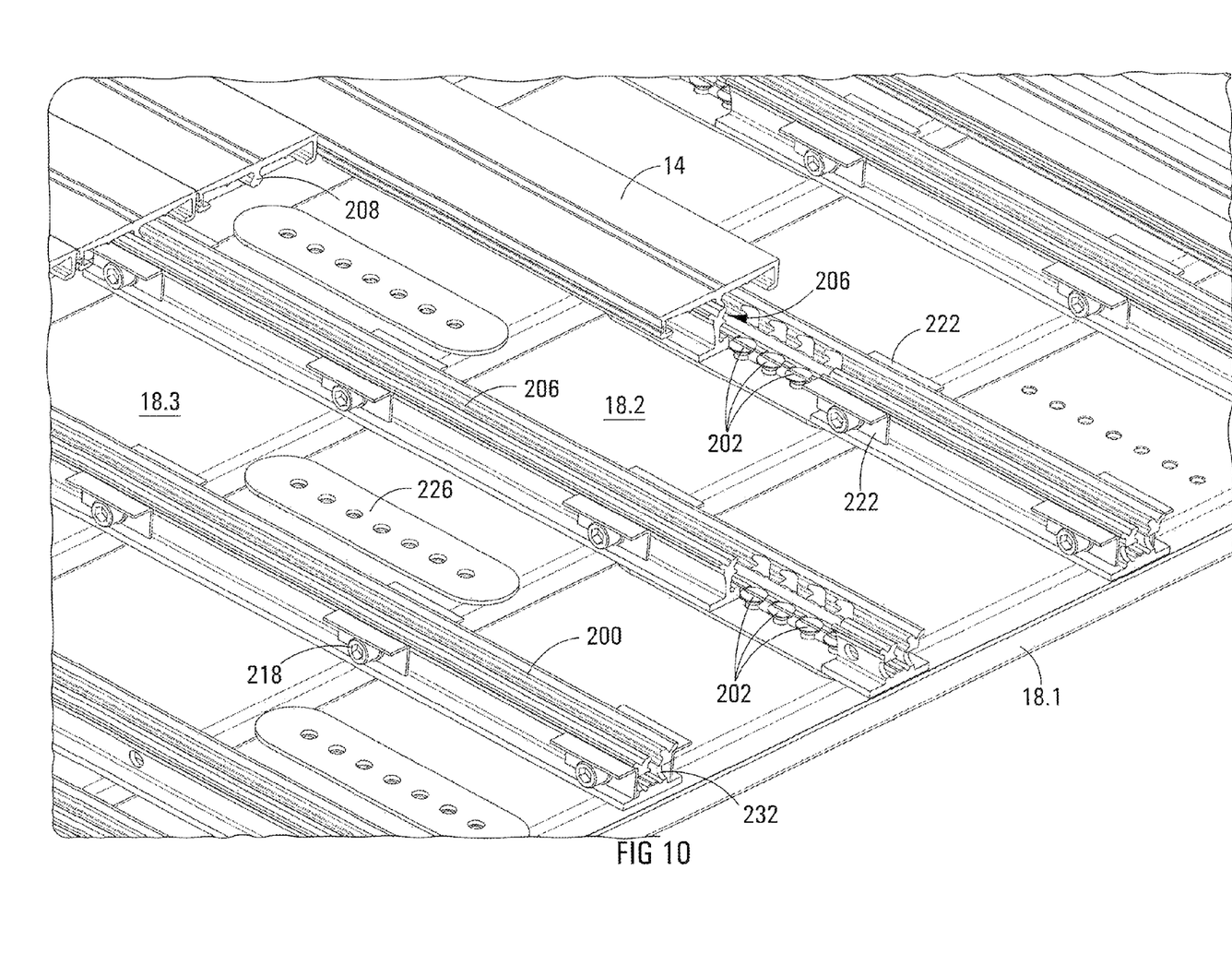
FIG. 10 shows a three-dimensional top view of a portion of the reciprocating floor of FIG. 1, with portions cut away for clarity.
Figure 11:
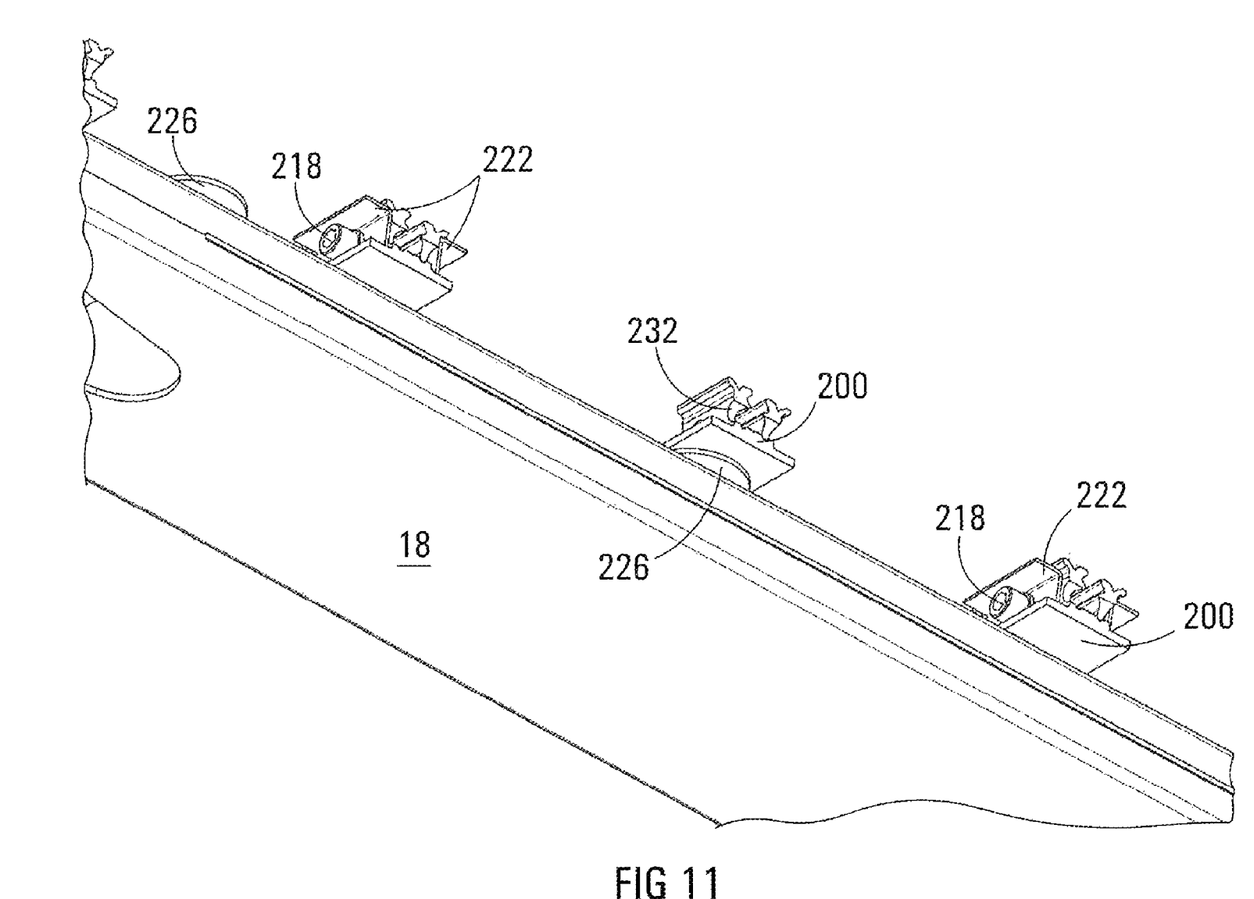
FIG. 11 shows a three-dimensional bottom view of one drive beam of the reciprocating floor of FIG. 1.

Each clamp member 200 has a length of about 685 mm, i.e. substantially more than the combined width of three transverse drive beams 18. A clamp member 200 mounted to a particular drive beam 18 thus projects over both of the other two drive beams 18, as shown in FIG. 10 of the drawings. The clamp members 200 mounted to the drive beams 18.1 and 18.3 also project slightly over the edge of the drive beam 18.1 or 18.3 which is remote from the drive beam 18.2. As shown in FIG. 11 of the drawings, the clamp member 200 projects even further over the edge of the drive beam 18 than the spacer 226, forming a doubling plate arrangement providing for stress dispersion and inhibiting the formation of cracks.

Figure 7:
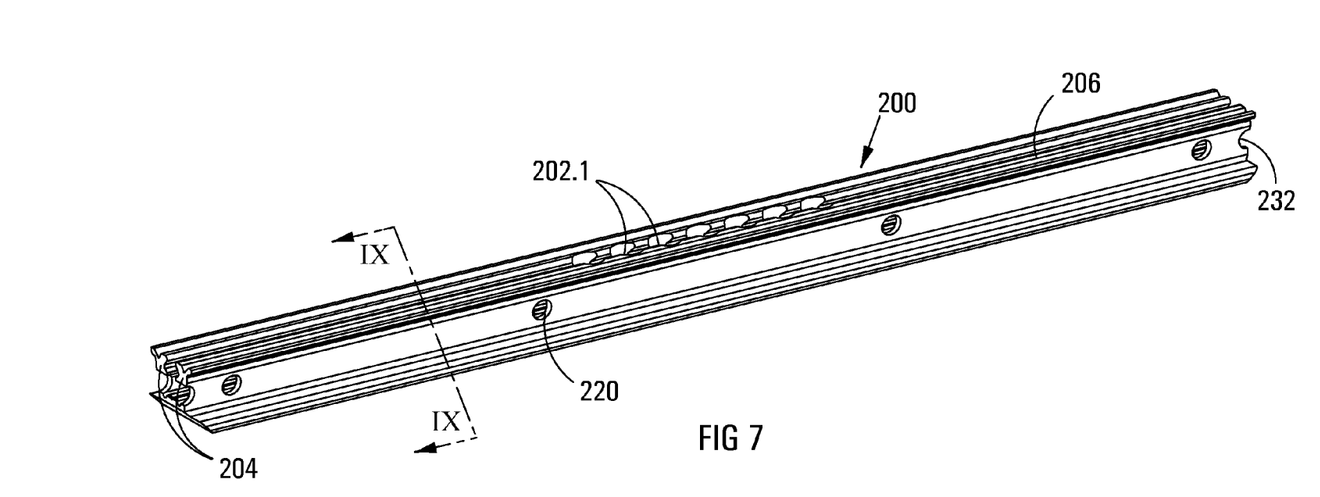
FIG. 7 shows a three-dimensional view of a clamp member of the reciprocating floor of FIG. 1.
Figure 8:
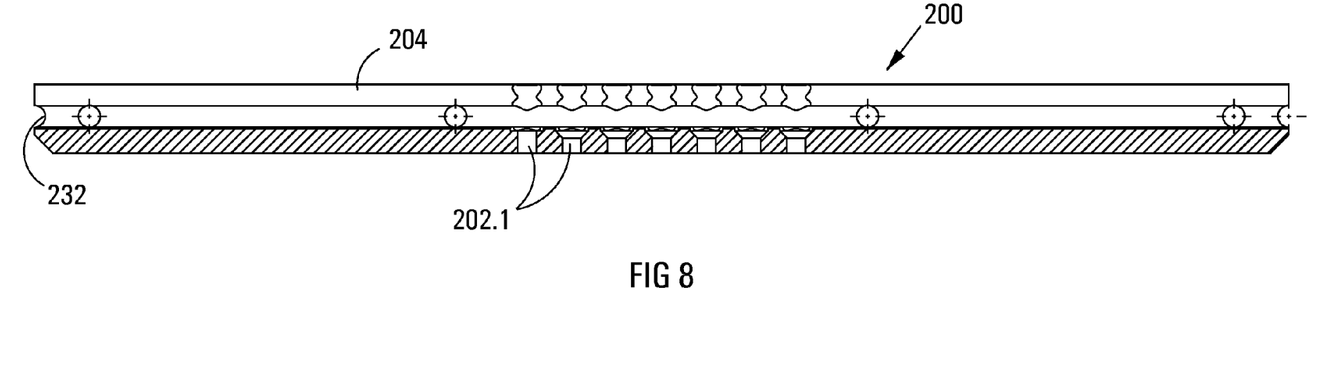
FIG. 8 shows a vertical longitudinal section through the clamp member of FIG. 7.

As can be deduced from the position of bolt holes 228 shown in FIG. 8 of the drawings, the clamp member 200 shown in FIGS. 7 and 8 is intended for bolting to the centre drive beam 18.2. Naturally, for clamp members 200 which are intended to be bolted to the drive beams 18.1 or 18.3, the bolt holes 228 will be closer towards one end of the clamp member 200, as can be seen in FIG. 10 of the drawings.

The apertures 220 are located such that the nuts 216 and bolts 218 can be accessed from below the drive beams 18. Thus, the nuts 216 and bolts 218 and the washer elements 222 act against the side walls 204 in regions adjacent the drive beams 18 and not directly above the drive beams 18, as is well illustrated in FIG. 10 of the drawings.

Where the clamp members 200 pass over a drive beam to which the clamp members 200 are not bolted, a planar bearing sheet of synthetic plastics or polymeric material (not shown) is provided and is sandwiched between the clamp member 200 and the drive beam 18 over which the clamp member 200 moves in association with the drive beam to which it is attached. Advantageously, such a bearing sheet provides more support below the clamp member 200 to resist impact or applied forces from above, i.e. on the floor surface 16 and these bearing sheets also provide additional stiffening to the drive beams 18. During use, the drive beams 18 also are subjected to a tilting moment which is transferred to the collars 58, and the bearing sheets also act to restrain this tilting motion. As with the spacers 226, ends of the bearing sheets may be rounded or radiused thereby to inhibit crack formation in the drive beams 18.

Each clamp member 200 has a base 230 which is continuous and which thus extends along the entire length of the clamp member 200, with no apertures or slots in a vertical direction passing through the base 230, apart from the pre-drilled bolt holes 202.1. This feature substantially strengthens the clamp members 200.

Ends of the clamp members 200 include recesses 232 extending inwardly in a longitudinal direction of the clamp members 200. The recesses 232 are provided in the side walls 204 and, although not shown in the drawings, preferably also in upper surfaces of the clamp members 200 defined by the side walls 204. Advantageously, these recesses 232 reduce stress to inhibit crack formation in the typically aluminium components.

The floor slats 14 are supported on elongate support beams 234 and elongate bearing members 236 sandwiched between the floor slats 14 and the support beams 234. Thus, both the support beams 234 and the bearing members 236 extend longitudinally underneath the floor slats 14, with the bearing members 236 providing bearing surfaces over which the floor slats 14 can slide in a reciprocating fashion as driven by their associated drive beams 18. The support beams 234 are supported in turn on the transverse chassis beams 64 and further transverse chassis beams (not shown) of the vehicle within which the reciprocating floor 10 is installed.

The illustrated mounting arrangement of the floor slats 14 to the drive beams 18, by means of the clamp members 200 in accordance with the invention, has the following advantages:

The nuts 216 and bolts 218 can be fastened either from the top or from the bottom of the floor slats 14, making them easier to install than conventional arrangements of which the Applicant is aware. The clamp members 200 can also easily be replaced as they are not welded to the drive beams 18. The clamp members 200 support the aluminium floor slats 14 above the linear hydraulic motor 12 over a much greater length of the floor slats 14 than in conventional reciprocating floors. Furthermore, the clamp members 200 provide a high beam value for the floor slats 14 in this area, thereby strengthening the floor slats 14. As a result, the floor slats 14 may be provided with lower or shorter side walls, thus reducing weight and cost. The clamp members 200 stiffen the drive beams 18 and because of this stiffening effect the Applicant expects that the linear hydraulic motor 12 may be operated at higher speeds than conventional drive units are capable of. As a result of the presence of the clamp members 200, the tilting moment exerted on the sliding collars 58 under load is reduced, thereby easing the sliding of the collars 58 over the cylinder 26, reducing friction, wear and tear. The use of the clamp members 200 allow fastening of a floor slat 14 to the clamp member 200 over a greater length of the floor slat 14 than was previously possible. Thus, a floor slat 14 can be clamped by a clamp member 200 in regions above all three of the drive beams 18.1, 18.2 and 18.3, even though the clamp member 200 is secured to only one of the drive beams 18.1, 18.2 or 18.3. The clamp members 200 reduce any possible sideways movement of the floor slats 14, thus reducing stresses exerted on the components of the drive unit 12. The use of the clamp members 200 eliminates the requirement for drilling and countersinking holes in the floor slats 14 providing an opportunity to reduce costs.

The invention claimed is:

1. A method of mounting a floor slat of a reciprocating floor to an associated drive beam of the floor slat, the method including
    mounting an elongate clamp member to the drive beam, the clamp member having a continuous base and opposed side walls defining a longitudinally extending clamping slot between them, the side walls defining a side wall bending region of horizontally narrower side wall transverse cross-section in a lower region of the side walls, thereby to assist the forcing closer together of the side walls in upper regions thereof;
    locating the floor slat on the clamp member, the floor slat having a downwardly depending longitudinally extending mounting member which is received in the clamping slot; and
    clamping the mounting member in the clamping slot thereby to attach the floor slat to the clamp member and thus to the drive beam, clamping the mounting member in the clamping slot including forcing at least parts of the opposed side walls of the clamp member closer together by bearing against the side walls in upper regions thereof above the bending regions in the side walls thereby to narrow the clamping slot in at least one region by bending the opposed side walls closer together.

2. The method as claimed in claim 1, in which the elongate clamp member has a length substantially greater than the width of the drive beam, so that the clamp member mounted to its associated drive beam thus projects over any or all other drive beams when the drive beams are arranged together at one end of their usual cyclic linear path.

3. The method as claimed in claim 1, in which the mounting member increases in transverse dimension in a downward direction over at least a portion thereof forming a key portion, with the clamping slot being dimensioned and shaped complementary to the key portion, being narrower in an upper region than lower down where the key portion is received, thereby to lock the key portion inside the clamping slot and preventing or inhibiting upwards movement of the mounting member from the clamping slot.

4. The method as claimed in claim 1, in which the clamp member is bolted to the drive beam and in which the mounting member is clamped in the clamping slot by forces acting on the opposed side walls in regions of the opposed side walls not located above the associated drive beam, or at least not where the clamp member is bolted to the associated drive beam.

5. The method as claimed in claim 1, which includes locating a bearing sheet between the clamp member and a drive beam over which the clamp member projects but to which it is not mounted.

6. The method as claimed in claim 1, in which the opposed side walls of the clamp member have outer wall surfaces which are further apart in upper regions thereof than in lower regions thereof and in which elongate fasteners extending transversely through the clamp member are used to bear against upper regions of the side walls, the fasteners bearing against the side walls only above longitudinal centre lines of the fasteners.

7. The method as claimed in claim 1, in which a line extending transversely through the clamping slot through said upper bearing regions of the side walls passes through the mounting member.

8. A reciprocating floor which includes at least one drive beam, a plurality of floor slats, and a plurality of elongate clamp members, wherein the at least one drive beam is configured to move in a reciprocating fashion with the plurality of floor slats mounted to the drive beam by means of associated elongate clamp members, at least some of the clamp members having a continuous base and opposed side walls defining a longitudinally extending clamping slot between them and at least some of the floor slats having downwardly depending longitudinally extending mounting members that are clamped inside the clamping slots of their associated clamp members, the side walls defining a side wall bending region of horizontally narrower side wall transverse cross-section in a lower region of the side walls, thereby to assist the bending closer together of the side walls in upper regions thereof by bearing against the side walls in upper regions thereof above the bending regions in the side walls.

9. The reciprocating floor as claimed in claim 8, in which the elongate clamp members include threaded fasteners acting on the side walls to clamp the mounting members of their associated floor slats between the side walls, the threaded fasteners being in the form of nut and bolt arrangements, with the bolts thus extending transversely through the opposed side walls of a clamp member, below the mounting member, and the nut and bolt arrangements each including a force transferring washer element acting against the side walls, the washer elements being elongate and being L-shaped in transverse cross-section, acting to lock the nut or the bolt of a nut and bolt arrangement by interfering with the rotation of the nut or bolt.

10. The reciprocating floor as claimed in claim 8, which includes a bearing sheet sandwiched between a clamp member and a drive beam over which a clamp member projects but to which it is not mounted or fastened.

11. The reciprocating floor as claimed in claim 8, in which the opposed side walls of a clamp member have outer wall surfaces which are further apart in upper regions thereof, than in lower regions thereof.

12. The reciprocating floor as claimed in claim 11, which includes elongate fasteners extending transversely through the clamp members, the fasteners bearing against the side walls only above longitudinal centre lines of the fasteners to clamp the mounting members of their associated floor slats between the side walls.

13. The reciprocating floor as claimed in claim 8, in which a line extending transversely through the clamping slot through said upper bearing regions of the side walls passes through the mounting member.

* * * * *